United States Patent Office 3,207,793
Patented Sept. 21, 1965

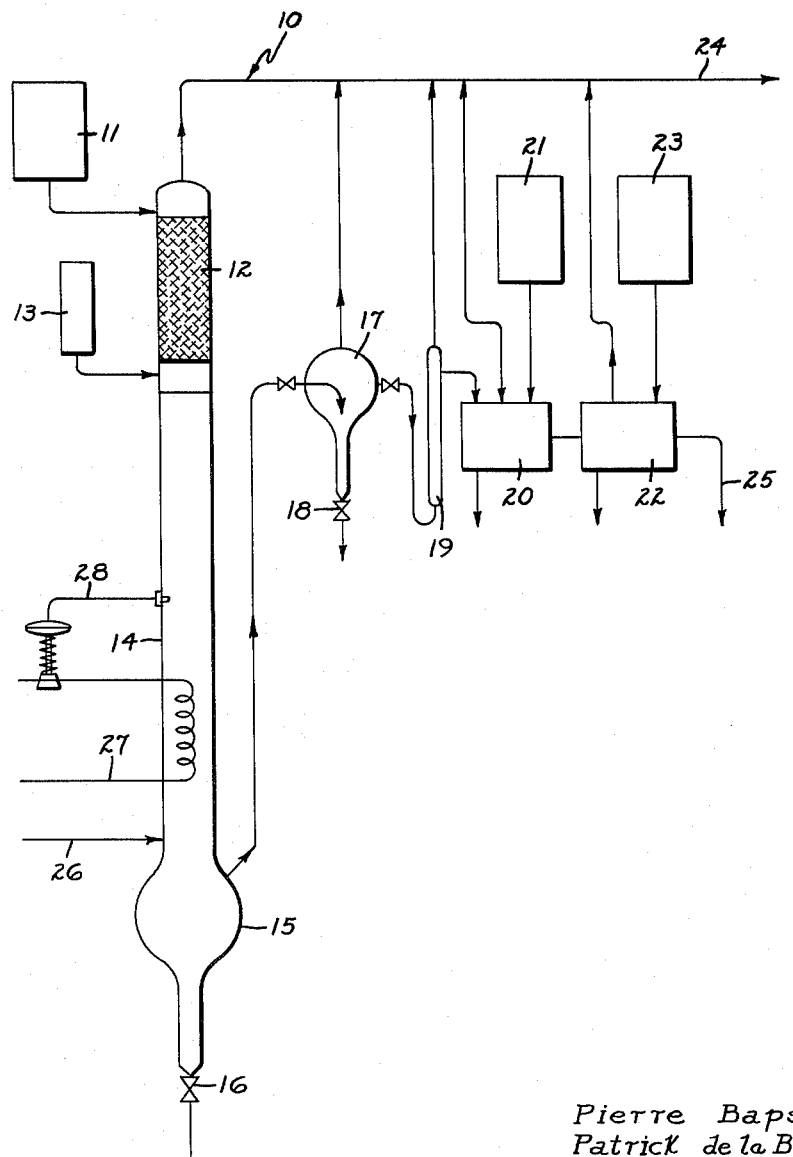
Pierre Bapseres
Patrick de la Bruniere
Bernard Audouze
Christos Nicolaides
INVENTORS

3,207,793
METHOD FOR THE PREPARATION OF
ALKYL MERCAPTANS
Pierre Bapseres, Pau, Patrick de la Bruniere, Paris, and Bernard Andouze and Christos Nicolaides, Pau, France, assignors to Societe Nationale des Petroles d'Aquitaine, Paris, France, a corporation of France
Filed Mar. 20, 1962, Ser. No. 182,997
Claims priority, application France, Mar. 20, 1961, 856,094
6 Claims. (Cl. 260—609)

This invention relates to a method and apparatus for the preparation of mercaptans and more particularly to a process and apparatus for the manufacture of alkyl mercaptans having either a straight or branched alkyl chain.

Mercaptans, particularly those having over six carbon atoms, are used commercially for many purposes, such as vulcanization accelerators in the production of rubber. The terdodecyl-cercaptan, for instance, is prepared on an industrial scale for this purpose. According to the prior art, this substance is obtained by the reaction of hydrogen sulfide and tetrapropylene in the presence of a Friedel-Crafts catalyst such as anhydrous aluminum chloride. As a practical matter, the tetramer of propylene which is used is a mixture of isomers. The reaction takes place according to the following formula:

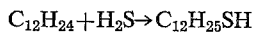

$$C_{12}H_{24}+H_2S \rightarrow C_{12}H_{25}SH$$

The known process is carried out at a pressure of around 8 atmospheres with a catalytic ratio by weight

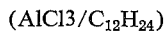

$$(AlCl3/C_{12}H_{24})$$

of around 0.04; when this process is carried out at a temperature of 10° C., the conversion rate is about 70%. The terdodecyl-mercaptan obtained is separated by distillation under reduced pressure; the fraction of tetrapropylene recovered and which may be recycled in very low, i.e., about 3%. This means that the yield of the process with respect to the tetrapropylene used does not exceed 73%. The apparent reason for this low yield is that secondary reactions use a large part of the starting material, principally because of polymerization and depolymerization in the reaction of the catalyst on the polypropylene. These and other difficulties experienced with the prior art processes and apparatus have been obviated by the present invention.

It is, therefore, an outstanding object of the invention to provide a process and apparatus for the preparation of mercaptans by the reaction of olefins and polymerized olefins with hydrogen sulfide which produce better yields and is easier to carry out than the known methods.

Another object of this invention is the provision of a method and apparatus for the production of mercaptans by the reaction of polypropylene and hydrogen sulfide in the presence of a Friedel-Crafts catalyst, wherein it is possible to use gaseous hydrogen sulfide diluted with other gases, such as carbon dioxide.

A further object of the present invention is the provision of a process for the production of alkyl mercaptans by the Friedel-Crafts reaction of polypropylene with hydrogen sulfide wherein the pressure used is substantially atmospheric and the apparatus used is substantially simplified.

It is another object of the instant invention to provide a Friedel-Crafts process for the production of mercaptans from polypropylenes and hydrogen sulfide in which the manipulation of the catalyst is greatly facilitated, the amount of catalyst used is precisely controlled, the activity of the catalyst is increased, and the amount of catalyst used is reduced.

It is a further object of the invention to provide a Friedel-Crafts process for the manufacture of mercaptans from olefins and their polymers and hydrogen sulfide, wherein parasitic polymerization of the olefins is prevented without reducing the activity of the catalyst.

Although the novel features which are believed to be characteristic of this invention will be particularly pointed out in the claims appended hereto, the invention itself, as to its objects and advantages, the mode of its operation, and the manner of its organization may be best understood by reference to the following description taken in connection with the accompanying drawings forming a part thereof, in which:

The single figure is a schematic view of an apparatus for performing a process for the production of mercaptans embodying the principles of the present invention.

Referring to the drawing, the apparatus, indicated generally by the reference numeral 10, is shown as having an olefin storage tank 11 connected by a pipe to the upper end of a reactor tower having an upper section 12 which is provided with a gas-and-liquid contact means such as Raschig rings adequately supported by well-known means. The tower is also provided with a lower section 14 the upper end of which is connected by a pipe to another storage tank 13. The lower section 14 is provided with a cooling coil 27 having a temperature-control means 28 connected at its bottom end to a decantation pot 15 the lower part of which is connected through a valve 16 to a discharge pipe. The intermediate part of the pot 15 is connected through a valved pipe to the central portion of a thickener vessel 17. A gas-introduction pipe 26 is connected to the upper part of the pot 15 and the bottom end of the lower section 14 of the tower. The bottom of the vessel 17 is connected through a valve 18 to a discharge pipe, while the upper portion is connected through a vertical pipe to a conduit 24. The conduit 24 leaves the top of the reactor tower and extends horizontally across the apparatus.

The center of the vessel 17 is connected by a valved pipe to the lower end of a density control device 19 whose upper end is connected through a vertical pipe to the conduit 24. An intermediate portion of the device 19 is conneceted by a pipe to a washer 20 which is supplied with acidified water from a reservoir 21. The washer is connected at the top by a vertical pipe to the conduit 24, while its bottom is provided with a discharge pipe. An intermediate portion of the washer 20 is connected by a pipe to a second washer 22 which is provided with water from a tank 23. The top of the washer 22 is connected by a vertical pipe to the conduit 24 and its bottom is provided with a discharge pipe. An intermediate portion of the washer 22 is provided with a pipe 25 leading to a distillation apparatus, not shown. The conduit 24 leads to a vapor disposal means, such as a burner, not shown.

According to the invention, the reaction can be carried out in a continuous manner in the apparatus 10. The storage tank 11 provides the olefin used, the storage tank 13 provides the catalyst mixed with a mercaptan, while dry hydrogen sulfide is introduced into the lower end of the reactor through the pipe 26. The hydrogen sulfide rises vertically through the apparatus in counterflow to the olefin and catalyst which are falling from the upper end. It can be seen that the hydrogen sulfide and the olefin are brought into intimate contact in the upper section 12 because of the sinuous flow and surface spreading brought about by the Raschig rings. By the time the liquid olefin reaches the area of introduction of the catalyst, it has absorbed large quantities of the gaseous hydrogen sulfide. The two then mix with the catalyst and fall through the tall lower section 14, meeting on the way down the rising flow of hydrogen sulfide. The lower portion 14 is the true reaction zone and is maintained at the required low temperature by the cooling coil 27 and the temperature-control means 28.

The product of the reaction runs down into the decantation pot 15 where the heavier catalyst residues drop to the bottom and are occasionally removed through the valve 16. The lighter crude product then flows to the purification vessels consisting of the thickener vessel 17, the density control device 19, the washer 20, and the washer 22. The improved product then passes outwardly of the apparatus through the pipe 25 for further purification in a distillation apparatus. This distillation apparatus, incidentally, separates out the polymerized olefins which have not taken part in the reaction from the main body of alkyl mercaptan product. The head fractions of this distillation are used as a solvent for the catalyst and are recycled to the storage tank 13.

With regard to the purification vessels, the vessel 17 decants further amounts of catalyst through the valve 18, while vapors pass upwardly to the conduit 24 through the vertical pipe. The product is treated with acidified water from the reservoir 21 in the washer 20 and with water from the tank 23 in the washer 22. Vapors are tapped from the tops of the device 19, the washer 20, and the washer 22 through the vertical pipes to the conduit 24, the same conduit also receiving various vapors from the top of the reactor tower.

According to the invention, the liquid olefin or polymerized olefin is treated with hydrogen sulfide at a pressure that does not exceed atmospheric by more than 1 kg./cm.$^2$, at a temperature below 10° C., the temperature in any case being low enough to permit large amounts of hydrogen sulfide to be dissolved in the reaction medium. This temperature can be in the range from 10° C. above zero to 30° C. below, but it is preferably in the range from 5° C. to above zero to 15° C. below. In the particular case in which terdodecyl-mercaptan is manufactured from tetrapropylene, the optimum temperature lies in the range from +5° C. to —5° C. In practice, this process is carried on at approximately atmospheric pressure, the true pressure being the ambient atmospheric pressure plus the loss of head of the column of reacting substances within the tower, so that the apparatus is relatively simple in construction.

Another important feature of this arrangement is that the Friedel-Crafts catalyst is used in the form of a solution in a mercaptan, preferably the one which it is desired to produce. This not only facilitates the handling of the catalyst, but it provides for even distribution of the catalyst through the reaction medium. As a result, it is easier to control the amount of catalyst with precision. At the same time, the activity of the catalyst is increased, so that smaller amounts may be used.

The solution of the catalyst in the alkyl mercaptan is a complex combination. This complex compound prevents the parasitic polymerization of the olefin, but does not reduce the activity of the catalyst in promoting the reaction of the hydrogen sulfide with the olefin. The alkyl mercaptan which is used as a solvent or carrier for the catalyst may contain some amount of olefin without presenting problems. Thus, it is permissible to use a head fraction of the distillation process which is later performed on the product of the reaction, which fraction contains both olefin and mercaptan.

Various catalysts of the Friedel-Crafts type, in addition to the anhydrous aluminum chloride described, may be used in the practice of the invention. Such a catalyst may be boron fluoride with hydrogen fluoride or phosphoric acid or it may be tin tetrachloride with phosphoric acid.

The invention may be used in the preparation of various alkyl mercaptans from different liquid olefins or polymerized olefins. For instance, the starting product may be selected from the dimers, trimers and tetramers of ethylene, propylene, butylene, and isobutylene; it may be an amylene, hexene, heptene, octene, decene, dodecene, tridecene, tetradecene, or a hexadecene. While it is particularly advantageous to use polymerized olefins, such as triethylene, tetraethylene, dipropylene, tripropylene, tetrapropylene, dibutylene, tributylene, tetrabutylene, diisobutylene, triisobutylene, the advantages of the invention may be obtained in this type of reaction with olefins such as hexene-1, 2-3-dimethyl-butene-1, 3-3-dimethyl-butene-2, 2-3-dimethyl-butene-2, 2-methylpentene-2, 2-4-dimethyl-pentene-2, 2-3-3-trimethyl-butene-1, octene-1, 2-4-4-trimethyl-pentene-1, 3-ethyl-hexene-2, and the like, provided that the starting material is liquid at temperatures in the range from —30° C. to +10° C.

Examples of the practice of the invention are as follows.

*Example 1*

In an apparatus as described above, the storage tank 11 contained tetrapropylene which was fed continuously at the top of the upper section 12 of the tower at the rate of 7.75 kg. per hour. At the same time, 1 liter per hour of a catalyst solution was introduced below the Raschig rings from the storage tank 13. This solution consisted of terdodecyl mercaptan containing 170 grams per liter of anhydrous AlCl$_3$. Gas was introduced at the bottom of the lower section 14 of the tower at the rate of 2.6 cubic meters per hour; this gas consisted of 63% hydrogen sulfide and 37% carbon dioxide, which meant that the flow of hydrogen sulfide was 2.36 kilogram per hour. The gas remained in contact with the liquid in the tower for two hours, while the temperature in the reaction zone was maintained at 0° C. The 7.75 kg. per hour (46.1 moles) of tetrapropylene gave a crude product at the rate of 9 kg. per hour; from this product 6.42 kg. (31.7 moles) per hour of commercially pure terdodecyl mercaptan was separated, as well as 2.1 kg. per hour of recyclable distillate. This distillate consisted of 1.4 kg. (8.34 moles) per hour of tetrapropylene and 0.7 kg. (3.47 moles) per hour of terdodecyl-mercaptan. There was a residue of only 0.48 kg. per hour. The catalyst ratio (AlCl$_3$/C$_{12}$H$_{24}$) was 0.022.

It can be seen, then, that from the 37.76=(46.1—8.34) moles of tetrapropylene per hour which were consumed, 35.17=(31.7+3.47) moles were actually converted to terdodecyl mercaptan, which represents at 93% conversion. One of the advantages of the invention can be seen by comparing this figure with the 73% obtained by the prior art practice. In the known processes, the proportion of recyclable olefin is in the order of 3% and the catalyst ratio must be around 0.04 or almost twice that used in the present invention. In this example, the terdodecyl mercaptan had a specific weight of 0.855, an index of refraction of 1.464, a total sulfur of 15%, and exhibited a distillation range of 82° C. to 107° C. at 5 mm. Hg.

*Example 2*

In an experiment similar to Example 1, the tetrapropylene was replaced with tripropylene with a vaporization temperature in the range of 134° to 150° C.; it is fed at the rate of 6.8 kg. per hour. The catalyst solution is constituted by ternonyl-mercaptan having 180 g. AlCl$_3$ per litre. The results were good.

Example 3

Instead of anhydrous aluminum chloride the catalyst was 330 g. of $SnCl_4$ with 50 g. $H_3PO_4$ per litre used in an operation similar to that of Example 1. The results were good.

Example 4

In order to prepare octyl-mercaptan, 5.15 kg. of a mixture of normal octenes, having a vaporization temperature in the range of 121°–124° C. was fed hourly according to the procedure set forth in Example 1. The temperature of the reaction zone was maintained at −3° C.; the catalyst is dissolved in normal octyl-mercaptan. The results were good.

Example 5

The olefins of Example 4 were replaced with diisobutylene with a vaporization temperature in the range from 97° C. to 107° C. (mixture of trimethyl 2-4-4-pentene-1 and trimethyl 2-4-4-pentene-2). The reaction was carried out at −5° C. The catalyst, $AlCl_3$, was dissolved in tertiary octylmercaptan. Trimethyl-2-4-4-pentene-thiol 2 is obtained with good results.

Example 6

A procedure similar to Example 5, but the olefin was replaced with ethyl-3-hexene-2 which boils at 121° C. The absorption of $H_2S$ is carried out at −2° C. with good results.

Example 7

A mixture of hexene-1 and hexene-2, boiling between 65° and 67° C. was passed at an hourly rate of 3.87 kg. through the reaction zone of the apparatus described in the specification. The operation was carried out in the same manner as in Example 1, the reaction zone being kept at −10° C. The catalyst was in solution in hexyl-mercaptan and the results were good.

Example 8

A mixture of isomers of amylene, having a boiling point in the range from 30° to 38° C., rich in pentene-1 was treated with $H_2S$ while the reaction zone was kept at −15° C. The mixture was circulated at the rate of 3.3 kg. per hour. The catalyst solution was constituted by amyl-mercaptans having 90 g. $AlCl_3$ per litre.

Example 9

In an operation similar to that of Example 8 the catalyst was 35 g./l. of $BF_3$ and 10 g./l. HF. The tower and the storage tank 13 of the apparatus above described were kept at about −20° C. with good results.

Example 10

An operation as described in Example 1 was carried out with an hourly flow of 7.75 kg. of tri-isobutylene. The catalyst solution comprised terdodecyl-mercaptan containing 200 g. $AlCl_3$ per litre. The reaction zone was cooled to −5° C. and the results were good.

Example 11

For the purpose of producing tridecyl-mercaptan, the polymer of propylene, as set forth in Example 1, was replaced with tridecenes rich in tridecene-1, which was fed at the rate of 8.4 kg. per hour. The reaction zone is kept at +10° C. with good results.

Example 12

A procedure was carried out as set forth in Example 1 but tetrapropylene was used with a mixture of olefins having 12, 14 and 16 carbon atoms in their molecule. The mixture was fed at the rate of 7.7 kg./hour, while the reaction zone was at +5° C. The catalyst solution was a mixture of mercaptans produced in the preparation containing 210 g. $AlCl_3$ per litre.

Example 13

The olefin used was an hexadecene fraction rich in hexadecene-1, the melting temperature of which is about 0° C. The fraction was passed with an output of 10 kg./hour through the reaction zone which was kept at +8° C. The anhydrous aluminum chloride used as catalyst was dissolved in butyl-mercaptan fed to the reaction zone at the rate of 1.2 litres per hour; this solution acted as a catalyst and also as a liquid agent maintaining in the liquid state the reacting compounds within the reaction zone. The butyl-mercaptan being much more volatile than the hexa-decyl-mercaptans which are prepared, it was separated at the top of a distillation column, and was recycled into the storage tank along with fresh catalyst.

Example 14

Using a preparation similar to that of Example 13, the catalyst used was $ZnCl_2$ with a concentration of 185 g. per litre of butyl-mercaptan. The results were good.

While certain novel features of the invention have been shown and described and are pointed out in the annexed claims, it will be understood that various omissions, substitutions, and changes in the forms and details of the method and apparatus illustrated and in its operation may be made by those skilled in the art without departing from the spirit of the invention.

The invention having been thus described, what is claimed as new and desired to secure by Letters Patent is:

1. A process for the production of lower alkyl mercaptans having up to 16 carbon atoms in the alkyl group, comprising the steps of:

providing a vertical upward flow of dry hydrogen sulphide gas, introducing into a first position in the said flow a polymeric olefin having up to 16 carbon atoms in its molecule, introducing into a second position in the said flow a solution of a Friedel-Crafts catalyst in a mercaptan, the first and second positions being separated by a sufficient distance to permit a substantial absorption of hydrogen sulphide by the polymeric olefin before the resulting solution contacts said solution of catalyst, permitting the resulting solution and the catalyst solution to fall together through a reaction zone in counterflow to a rising stream of dry hydrogen sulphide gas, maintaining the temperature of the reaction zone below the boiling point of the alkyl mercaptan product and in the range from −30° C. to +10° C. and maintaining the pressure of the reaction zone at substantially atmospheric pressure, and recovering the resulting alkyl mercaptan product.

2. The process of claim 1 wherein the polymeric olefin is a polymer of propylene.

3. The process of claim 1 wherein the hydrogen sulphide reactant is introduced as a mixture of $H_2S$ with $CO_2$.

4. The process of claim 1 wherein the olefin reactant has from 4 to 16 carbon atoms.

5. The process of claim 1 wherein the mercaptan is terdodecyl-mercaptan, the polymeric olefin is tetrapropylene and the catalyst is anhydrous aluminum chloride.

6. A continuous process for producing a liquid alkyl-mercaptan having up to 16 carbon atoms in the alkyl group in which dry hydrogen sulphide gas is reacted with a liquid olefin having up to 16 carbon atoms in its molecule, in the presence of a Friedel-Crafts catalyst, which process comprises:

dissolving the catalyst in a liquid alkyl-mercaptan having up to 16 carbon atoms in its molecule, admixing the solution thus obtained with the liquid olefin, passing a stream of the liquid mixture of said olefin, said mercaptan, and said catalyst continuously through a reaction zone in counter-flow to gaseous hydrogen sulphide, the temperature in the reaction zone being maintained at a temperature below the boiling point of said mercaptan and of the mercaptan which is to be produced and below $+10°$ C. and the pressure within the reaction zone being no higher than 2 kg./cm.$^2$, and recovering the liquid alkyl-mercaptan so produced.

References Cited by the Examiner

UNITED STATES PATENTS

| | | | |
|---|---|---|---|
| 1,987,905 | 1/35 | Houdry | 23—288 |
| 2,545,384 | 3/51 | Rehrig | 23—288 |
| 2,551,813 | 5/51 | Pinkney | 260—609 |
| 2,925,443 | 2/60 | Welsh | 260—609 |
| 3,032,592 | 5/62 | Frantz et al. | 260—609 |

FOREIGN PATENTS

| | | |
|---|---|---|
| 500,550 | 3/54 | Canada. |

CHARLES B. PARKER, *Primary Examiner.*

DANIEL D. HORWITZ, *Examiner.*